United States Patent
Hogge et al.

(10) Patent No.: US 12,515,242 B2
(45) Date of Patent: Jan. 6, 2026

(54) SYSTEMS AND METHODS FOR SORTING GOLF BALLS HAVING A RADAR DETECTABLE MARK

(71) Applicant: Acushnet Company, Fairhaven, MA (US)

(72) Inventors: Matthew F. Hogge, Plymouth, MA (US); Martin Gray, Tauton, MA (US); Nicholas M. Nardacci, Barrington, RI (US); Vincent J. Simonds, Brimfield, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/397,436

(22) Filed: Dec. 27, 2023

(65) Prior Publication Data

US 2024/0123469 A1    Apr. 18, 2024

Related U.S. Application Data

(63) Continuation-in-part of application No. 18/240,586, filed on Aug. 31, 2023, which is a
(Continued)

(51) Int. Cl.
| | |
|---|---|
| *B07C 5/34* | (2006.01) |
| *A63B 47/00* | (2006.01) |
| *B07C 5/344* | (2006.01) |
| *A63B 37/00* | (2006.01) |
| *B07C 5/36* | (2006.01) |

(52) U.S. Cl.
CPC .......... *B07C 5/3412* (2013.01); *A63B 47/008* (2013.01); *B07C 5/3416* (2013.01); *B07C 5/344* (2013.01); *A63B 37/0077* (2013.01); *A63B 2220/05* (2013.01); *A63B 2220/89* (2013.01); *B07C 5/362* (2013.01)

(58) Field of Classification Search
CPC ..... B07C 5/3412; B07C 5/3416; B07C 5/344; A63B 37/0077; A63B 47/008; A63B 2220/05; A63B 2220/89
See application file for complete search history.

(56) References Cited

U.S. PATENT DOCUMENTS

| | | | | |
|---|---|---|---|---|
| 3,757,942 A | * | 9/1973 | Gunn .................. | B07C 1/20 101/2 |
| 4,201,339 A | * | 5/1980 | Gunn .................. | B07C 1/20 235/487 |

(Continued)

*Primary Examiner* — Joseph C Rodriguez
(74) *Attorney, Agent, or Firm* — Steven Landolfi, Jr.

(57) ABSTRACT

A golf ball sorting system has a ball feeder configured to transport a plurality of golf balls. At least some of the golf balls have a conductive marking pattern that is not visible to an observer because the marking pattern is covered by at least one other layer of the golf ball. A detection system receives the golf balls, inspects the golf balls, and outputs a detection result. A sorting system receives the detection result and sorts the plurality of golf balls based on the detection result to separate the plurality of golf balls into at least three groups, including a first category of golf balls that do not have the marking pattern, a second category of golf balls that have a first type of the marking pattern, and a third category of golf balls that have a second type of the marking pattern.

8 Claims, 15 Drawing Sheets

Related U.S. Application Data continuation-in-part of application No. 17/496,823, filed on Oct. 8, 2021, now Pat. No. 11,745,225.

(56) References Cited

U.S. PATENT DOCUMENTS

| | | | | |
|---|---|---|---|---|
| 6,168,080 | B1* | 1/2001 | Verschuur | B07C 1/00 |
| | | | | 235/487 |
| 6,462,303 | B2* | 10/2002 | Brown | A63B 45/02 |
| | | | | 219/121.69 |
| 9,251,634 | B1* | 2/2016 | Fraser | H04L 9/3247 |
| 11,058,924 | B1* | 7/2021 | Caterina | G01N 23/04 |
| 2002/0040865 | A1* | 4/2002 | Steinkogler | G07D 11/50 |
| | | | | 209/534 |
| 2010/0161111 | A1* | 6/2010 | Davis | B07C 5/344 |
| | | | | 700/215 |
| 2022/0184666 | A1* | 6/2022 | Wicks | B25J 9/1612 |
| 2023/0316212 | A1* | 10/2023 | Gil | G06Q 10/083 |
| | | | | 705/330 |
| 2024/0002630 | A1* | 1/2024 | Alon | B07C 5/346 |

* cited by examiner

SYSTEMS AND METHODS FOR SORTING GOLF BALLS HAVING A RADAR DETECTABLE MARK

CROSS REFERENCE TO RELATED APPLICATIONS

The present application is a continuation-in-part of U.S. patent application Ser. No. 18/240,586, filed Aug. 31, 2023, which is a continuation-in-part of U.S. patent application Ser. No. 17/496,823, filed Oct. 8, 2021, now U.S. Pat. No. 11,745,225 the entire disclosures of which are hereby incorporated herein by reference.

FIELD OF THE INVENTION

The present disclosure relates generally to system for identifying golf balls having a mark, or a plurality of marks, and, more particularly, relates to a sorting system for distinguishing golf balls having radar detectable marks from golf balls that do not have radar detectable marks and/or golf balls having different radar detectable marks.

BACKGROUND OF THE INVENTION

Interest continues to increase in golf experiences which require a system for detecting golf ball launch conditions, such as golf simulators and golf equipment fitting. Such systems typically use radar tracking systems to identify the position and velocity of the golf ball to calculate the launch parameters and trajectory of the ball. These radar tracking systems have been improved by including specific radar detectable marks on the golf balls and using the marked golf balls in conjunction with the system instead of an unmarked golf ball.

Golf balls that include these radar detectable marks are useful in providing launch condition data, but may be indistinguishable from golf balls not having such marks, depending on how the marks are applied. For instance, a radar detectable mark may be applied to a layer that is not the outer-most layer of the golf ball, and thus is covered by another layer and/or paint, rendering the mark invisible to an observer. This characteristic can be beneficial to allow the golfer to use marked golf balls interchangeably with unmarked golf balls, but may cause problems in certain instances. For example, this condition could lead to situations in which it is unknown whether a supply of golf balls are marked, unmarked, or include both types. Other issues may arise around quality control, for example, as a visual inspection of the mark on the golf ball would not be possible. Disclosed embodiments address these and other problems associated with golf balls having radar detectable marks.

SUMMARY OF THE INVENTION

In an embodiment, the present disclosure includes a golf ball sorting system. The system includes a ball feeder configured to transport a plurality of golf balls, wherein at least some of the plurality of golf balls have a marking pattern including a conductive material that is not visible to an observer because the marking pattern is covered by at least one other layer of the golf ball. The system also includes a detection system configured to receive the plurality of golf balls, inspect the plurality of golf balls, and output a detection result from a control unit. The system also includes a sorting system configured to receive the detection result and sort the plurality of golf balls based on the detection result to separate the plurality of golf balls into at least three groups each corresponding to different categories of golf balls, including a first category of golf balls that do not have the marking pattern including a conductive material, a second category of golf balls that have a first type of the marking pattern including a conductive material, and a third category of golf balls that have a second type of the marking pattern including a conductive material.

In an embodiment, the present disclosure includes a golf ball sorting system. The system includes a radar detector configured to inspect a golf ball and determine a first detection result based on whether a first marking pattern including an electrically-conductive ink is identified on the inspected golf ball, wherein the first marking pattern is not visible to an observer because the first marking pattern is covered by at least one other layer of the golf ball. The system also includes an inductive sensor configured to inspect a golf ball and determine a second detection result based on whether a second marking pattern including an ink containing a magnetic and/or ferromagnetic material is identified on the inspected golf ball, wherein the second marking pattern is not visible to an observer because the second marking pattern is covered by at least one other layer of the golf ball. The system further includes a sorting system configured to sort golf balls into at least three groups based on the first detection result and the second detection result.

In another embodiment, the present disclosure includes a method of sorting golf balls. The method includes receiving a plurality of golf balls at a detection system, wherein the detection system includes a control unit and at least one detecting unit. The plurality of golf balls include at least some golf balls having a first type of marking pattern including a conductive material and at least some golf balls having a second type of marking pattern including a conductive material. The detection system is further configured to differentiate between the first type of marking pattern and the second type of marking pattern. The method also includes inspecting, by the detection system, the plurality of golf balls, generating, by the control unit, a detection result based on the inspection and sending the detection result to a sorting system, and separating, by the sorting system, the plurality of golf balls into a first group of golf balls including the first type of marking pattern and a second group of golf balls including the second type of marking pattern, based on the detection result.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF THE INVENTION

In order to improve the ability of some golf ball monitoring systems, such as launch monitors and golf simulators, to identify a golf ball in-flight and detect its motion parameters, certain marks have been added to one or more surfaces of the golf ball. For example, a golf ball may include one or more layers which have at least one radar detectable mark disposed on a surface thereof. The radar detectable mark or combination of marks is identifiable by a radar detection device to enhance detection reliability and help to orient the ball and measure its translational and rotational velocity as it moves through the air at launch.

Disclosed embodiments include systems and methods for sorting golf balls having one or more marks, and, in particular, golf balls that have radar detectable marks that are not visible to an observer. The system may include at least a detector and a sorting system. The detection mechanism may be configured to make a determination as to whether a golf ball includes a mark based on information obtained from the golf ball. The sorting system may be configured to receive the determination from the detection mechanism and perform an action to indicate the result of the determination. For example, the sorting system may direct the ball to a particular collection bin depending on whether the detection mechanism detects a mark on the golf ball.

Disclosed embodiments may be implemented in a variety of systems, including stand-alone sorting systems and in-line manufacturing systems. In one example, a source of golf balls is fed to a detection mechanism and the golf balls are sorted based on output of the detection mechanism. In another example, a disclosed system may be incorporated into a manufacturing or packaging line to sort and/or perform quality control to identify golf balls that have a mark and/or separate out golf balls that do not have a mark.

Further, disclosed embodiments are not limited to detection of any particular type or shape of mark and can be adapted to work in different systems and environments depending on the mark being target. In addition, disclosed embodiments are not limited to radar detection and radar detectable marks. Disclosed embodiments may include systems that use other types of detection other than radar, such as optical sensing, x-ray sensing, magnetic sensing, etc. It follows that golf balls with marks that are not radar detectable may nonetheless be used in conjunction with some disclosed detection systems. Moreover, it is not necessary that the mark be non-visible to an observer, as there is a benefit of high-speed sorting of a large quantity of golf balls regardless of whether the mark can be seen.

Figure 1:
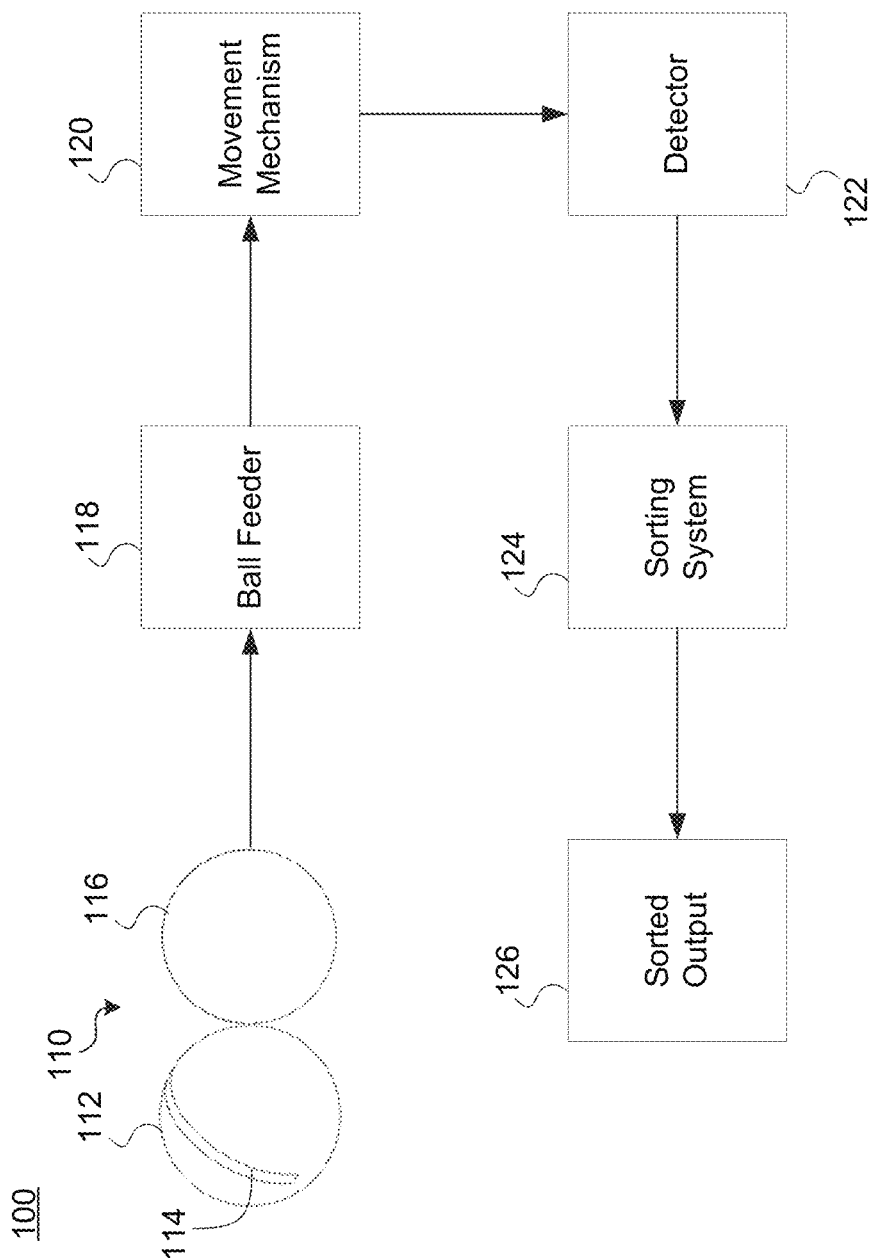
FIG. 1 is a diagram of an exemplary embodiment of a golf ball sorting system, consistent with disclosed embodiments.

FIG. 1 is a diagram of an exemplary golf ball sorting system 100. The golf ball sorting system 100 may be configured to receive a source of golf balls 110, where the source of golf balls 110 may include at least one of a golf ball 112 having a radar detectable mark 114 or a golf ball 116 not having a radar detectable mark. The system 100 may be configured to distinguish between golf ball 112 and golf ball 116. The particular radar detectable mark 114 is not limited and may include a single mark or a plurality of marks. Although the radar detectable mark 114 is shown in the figure for illustrative purposes, it should be understood that in at least some embodiments the radar detectable mark 114 is applied to an underlying surface of the golf ball 112 and is not visible to an observer (e.g., because it is covered by another layer, paint, etc.). In some embodiments, the mark may be visible, such as when it is applied to an outermost layer or an outer layer is transparent. In some embodiments, the radar detectable mark 114 is a metallic substance. For example, the radar detectable mark 114 may be an electrically conductive ink applied to a layer of the golf ball 112. Non-limiting examples of golf balls having radar detectable marks are described in U.S. patent application Ser. Nos. 17/515,971, 17/515,922, 17/515,943, 17/552,380, 17/553,122, 18/072,801, 18/072,791, 18/191,205, each of which is hereby incorporated by reference in their entirety.

The golf ball sorting system 100, in at least one embodiment, includes a ball feeder 118, a movement mechanism 120, a detector 122, and a sorting system 124. The source of golf balls 110 is received at the ball feeder 118 and is output by the sorting system 124 to produce sorted output 126. The ball feeder 118 may be configured to receive and singulate a plurality of golf balls such that they may be individually fed to the movement mechanism 120.

The movement mechanism 120 may be configured to induce movement of a golf ball received from the ball feeder 118 and place the golf ball under conditions that are acceptable for analysis by the detector 122. For example, the movement mechanism 120 may include a track having a length and pitch specified to induce a threshold translational and rotational velocity to the golf ball. In other embodiments, the movement mechanism 120 may be motorized or otherwise powered device configured to impart motion to the golf ball. In still other embodiments, the movement mechanism 120 may be a cart or tubing configured to move the golf ball through the golf ball sorting system 100. The movement mechanism 120 may be part of a manufacturing and/or packaging line that provides golf balls to the detector 122 and further transfers the inspected golf balls to a further manufacturing or packaging station after sorting.

The detector 122 may be a detection mechanism configured to interface with a golf ball, such as a golf ball placed into motion by the movement mechanism 120. The detector 122 may be configured to detect at least one parameter of the golf ball, wherein the parameter indicates the presence or absence of a target mark. For example, the detector 122 may be a ball launch monitor configured to detect a mark on the golf ball using radar. The ball launch monitor may be a device configured to switch between a monitoring mode in which the device is set to detect launch conditions of a golf ball hit with a golf club and a detection mode in which the device is configured to detect the mark on the golf ball and output a result. In other embodiments, the detector 122 may be configured to use other means of detection, such as metal detection, optical scanning, x-ray, infrared, mass detectors (weight), etc. For example, the detector 122 may be a ring sensor to detect trace levels of nonferrous metal used to apply a mark. For example, the detector 122 may use an Altech™ 100 mm high sensitivity ring sensor. The detector 122 in this embodiment may be configured to detect metal with a low presence level while product is moving through the sensor.

The sorting system 124 may be a mechanical device configured to perform an action based on the result of a detection result. For example, the sorting system 124 may be configured to direct a golf ball to a particular location (e.g., a collection bin) based on a detection result (i.e., a determination that a golf ball does or does not have a radar detectable mark). In another example, the sorting system 124 may be configured to perform an action to identify a golf ball as marked or unmarked, such as by applying a stamp, sticker or tag to the golf ball to identify the result of the detection result. As a result of the sorting system 124 performing an action on golf balls that have been inspected by the detector 122, the golf ball sorting system 100 produces the sorted output 126. For example, the sorted output 126 may include the golf ball 112 with the radar detectable mark 114 placed into a first bin or pile and the golf ball 116 without the radar detectable mark placed into a second bin or pile.

Figure 2:
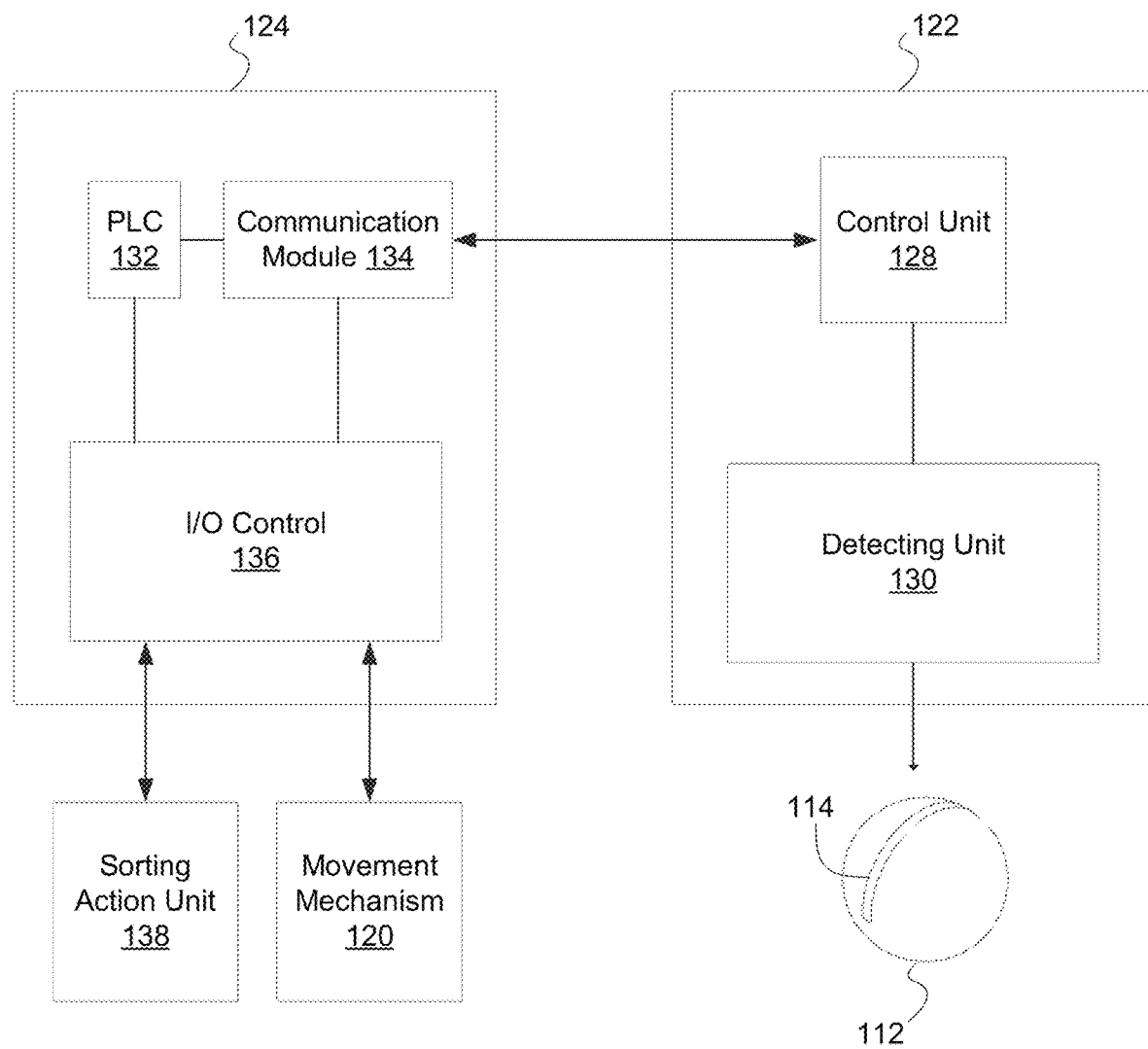
FIG. 2 is a diagram of an exemplary embodiment of a detector and a sorting system of the golf ball sorting system.

FIG. 2 is a block diagram further illustrating an exemplary embodiment of the detector 122 and the sorting system 124. In an exemplary embodiment, the detector 122 includes at least a control unit 128 and a detecting unit 130. The control unit 128 may be a computing device such as a microcontroller configured to perform one or more software tasks. The control unit 128 may be configured to send and receive data to and from the detecting unit 130. For example, the control unit 128 may send a signal to turn on the detecting unit 130 and instruct the detecting unit 130 to obtain detection data. The detecting unit 130 may be a sensor, such as a doppler radar sensor, inductive sensor (also referred to herein as an induction sensor), laser detector, metal detector, optical sensor, x-ray device, etc. The detecting unit 130 may receive an instruction from the control unit 128 and return detection data (e.g., signals indicative of a target parameter) to the control unit 128. The control unit 128 may be configured to analyze the returned detection data and determine a detection result, such as the presence or absence of a target mark on a golf ball. For example, the detecting unit 130 may be a doppler radar sensor that directs attention to a radar detectable mark 114 present on the golf ball 112. The control unit 128 may determine that the radar detectable mark 114 is present based on the data received from the detecting unit 130 and produce an appropriate output signal. For example, the control unit 128 may measure a signal strength in the data received from the detecting unit 130 and determine whether the signal exceeds a threshold that reliably indicates the presence of a target mark.

The control unit 128 is configured to electronically interface with the sorting system 124. The sorting system 124 may include a programmable logic controller (PLC) 132, a communication module 134, and one or more input/output (I/O) controls 136. The PLC 132 is configured to send and receive data to the control unit 128 of the detector 122 via the communication module 134. In one embodiment, the communication module 134 is an application programming interface (API) which enables the PLC 132 to interpret the data received from the control unit 128. For example, the control unit 128 may output a detection result, such as Yes/No/Undetermined based on a determination of whether a golf ball that is scanned by the detector 122 includes a mark. The PLC 132 may receive the detection result from the control unit 128 via the communication module 134.

The PLC 132 may be further configured to provide control instructions to components of the golf ball sorting system 100 via the I/O control 136. For example, the PLC 132 may provide an instruction to a sorting action unit 138 to perform a sorting action based on a detection result received from the control unit 128. In one example, the sorting action unit 138 may be a control valve configured to control the path of a golf ball. For example, the sorting action unit 138 may direct a golf ball to a particular collection bin based on whether the golf ball was determined to be marked, unmarked, or undetermined. In another example, the sorting action unit 138 may apply an identification tag to a golf ball based on the detection result. In this way, a detection result can be converted into a mechanical action of sorting golf balls based on the presence or absence of a radar detectable mark, thereby informing a user seeking to identify one or more golf balls fed into the golf ball sorting system 100. In some embodiments, the PLC 132 may further control other aspects of the golf ball sorting system 100, such as the movement mechanism 120. For example, the PLC 132 may determine that a golf ball has cleared through a detection area and instruct the movement mechanism 120 to release the next golf ball for movement to the detection area (e.g., via a valve-controlled escapement block). Other examples of PLC 132 controls may include uplift/feeding by the ball feeder 118, release/transfer of a golf ball between different stages of the system, mode control and power switching of the control unit 128, control of feedback throughout the system (e.g., monitoring of safety sensors), and control of a user interface (e.g., a separate computing device, touchscreen, mobile device, etc.) The PLC 132 may be controllable to adjust the golf ball throughput of the golf ball sorting system 100 by adjusting one or more of the connected devices and systems.

Figure 3:
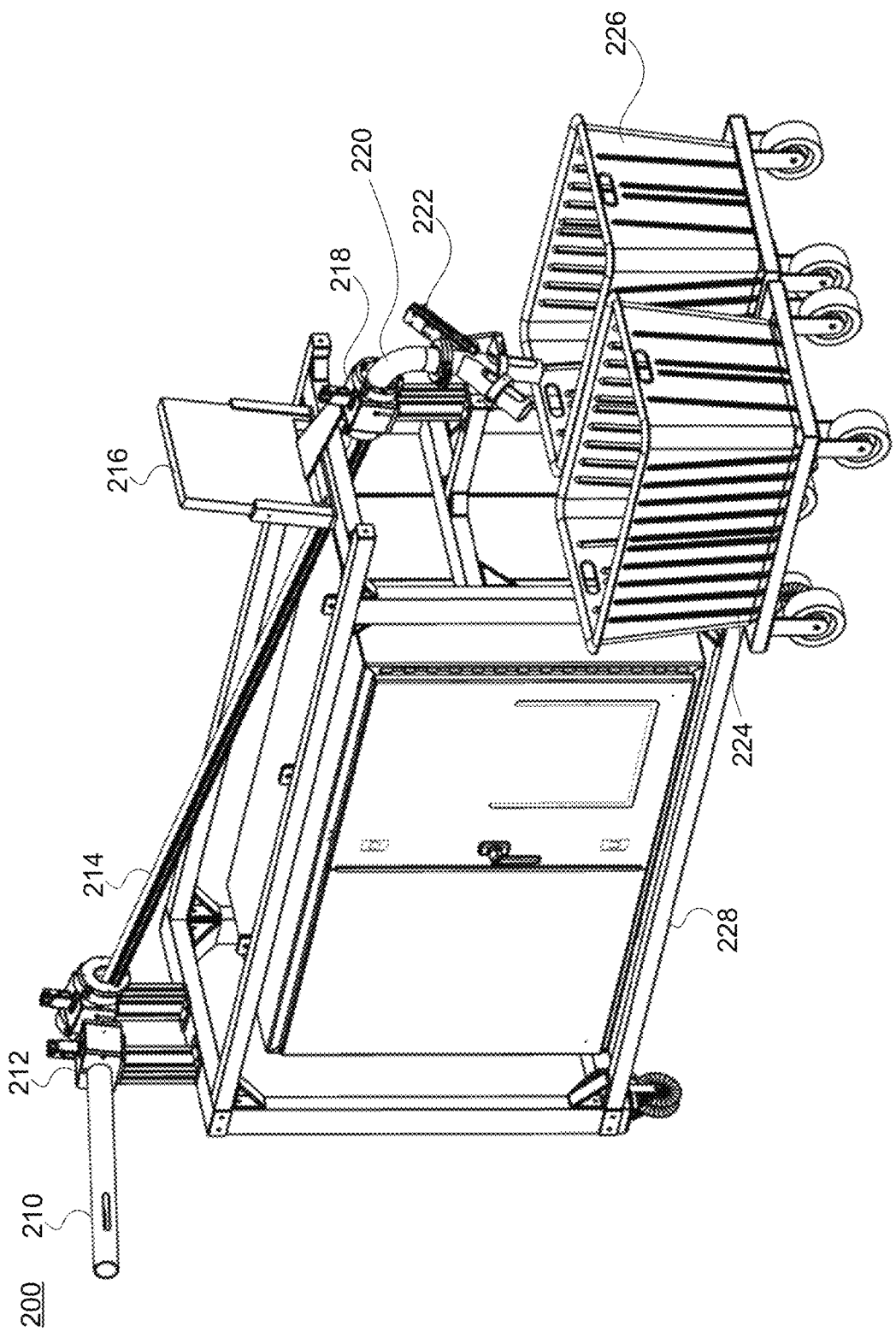
FIG. 3 is a perspective view of an embodiment of a golf ball sorting system, consistent with disclosed embodiments.
Figure 4:
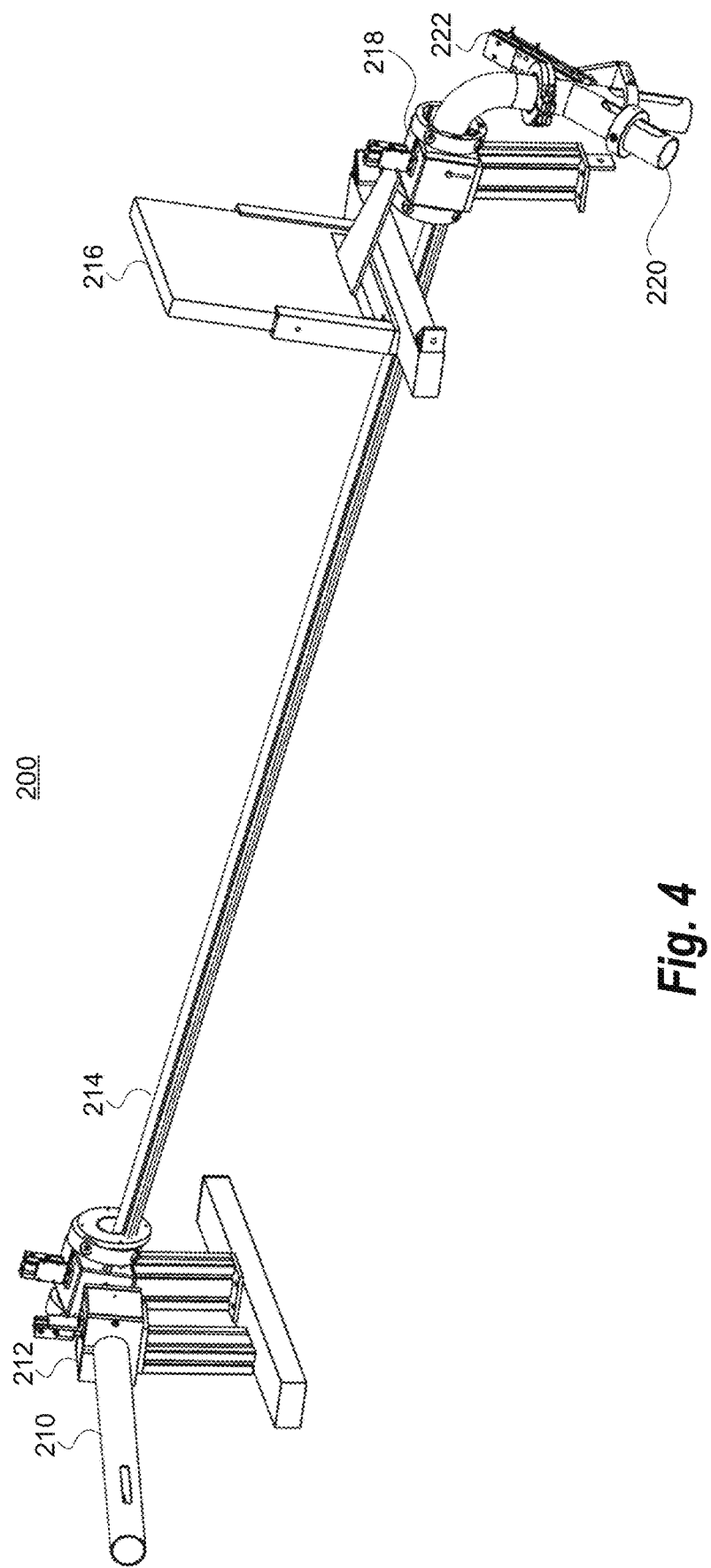
FIG. 4 is a perspective view of a moving, detecting, and sorting portion of the system of FIG. 3.

FIGS. 3 and 4 illustrate an exemplary embodiment of a golf ball sorting system 200. The golf ball sorting system 200 is an exemplary implementation of the golf ball sorting system 100. The golf ball sorting system 200 may include a ball feeder in the form of an input tube 210, a movement mechanism including a release block 212 and a sloped track 214, a detector 216 having a doppler radar sensor directed at an end portion of the track 214, and a sorting system including a output block 218, multi-path tubing 220, a path control device 222, and multiple collection bins 224 and 226. The golf ball sorting system 200 may be supported by a frame 228 to hold the relative positions of the components. In other embodiments, the golf ball sorting system 200 may be integrated into a manufacturing line, such as to perform quality control functions during a manufacturing process.

The input tube 210 may receive a plurality of golf balls for which it the presence, absence, or quality of a radar detectable mark is sought to be determined. The input tube 210 may be the general size and shape to receive a single-file line of golf balls and feed each golf ball to the release block 212. The release block 212 may be passively or actively controlled (e.g., via a valve) to release the golf ball onto the track 214. The track 214 may be, for example, a polycarbonate tube sized to support a rolling golf ball. The track 214 may include a length and pitch predetermined to impart at least a minimum speed (e.g., translational and rotational velocity) to the golf ball via gravity according to reliability specifications of the detector 216. In an exemplary embodiment, the pitch of the track 214 may be between 4-30 degrees relative to a horizontal plane with a track length of at least 24 inches. In one embodiment, the track 214 may include a pitch of 8 degrees relative to the horizontal and a length of at least 4 feet, as these parameters have been found to impart a sufficient translational and rotational velocity to the ball for reliable detection.

The detector 216 may be a radar device including a control unit configured to receive radar detection data of a golf ball passing through a detection area and output a detection result based on the received data. For example, the detector 216 may output a Yes/No/Undetermined detection result regarding whether the golf ball includes a target mark. The target mark may be any radar detectable mark or a radar detectable mark of sufficient quality to be detected. In some embodiments, the target mark is a marking added to the golf ball to enhance radar detection during launch monitoring (e.g., by the detector 216 or a similar device in a launch setting). In other embodiments, the target mark could be a quality or authenticity mark to distinguish the golf ball from other golf balls (e.g., counterfeit golf balls not bearing the mark).

The detector 216 is configured to output the detection result to a PLC of the golf ball sorting system 200. The PLC may receive the detection result and provide control instructions to a path control device 222 to control the path of the golf ball through the multi-path tubing depending on the detection result. For example, the path control device 222 may divert the golf ball to a selected path based on the detection result. The PLC may also perform throughput control through control of the release block 212 and the output block 218 to ensure proper timing and spacing between golf balls. In some embodiments, the PLC may control the golf ball sorting system 200 to sort approximately 20 balls per minute, and in some embodiments, up to 60 balls per minute.

Figure 5:
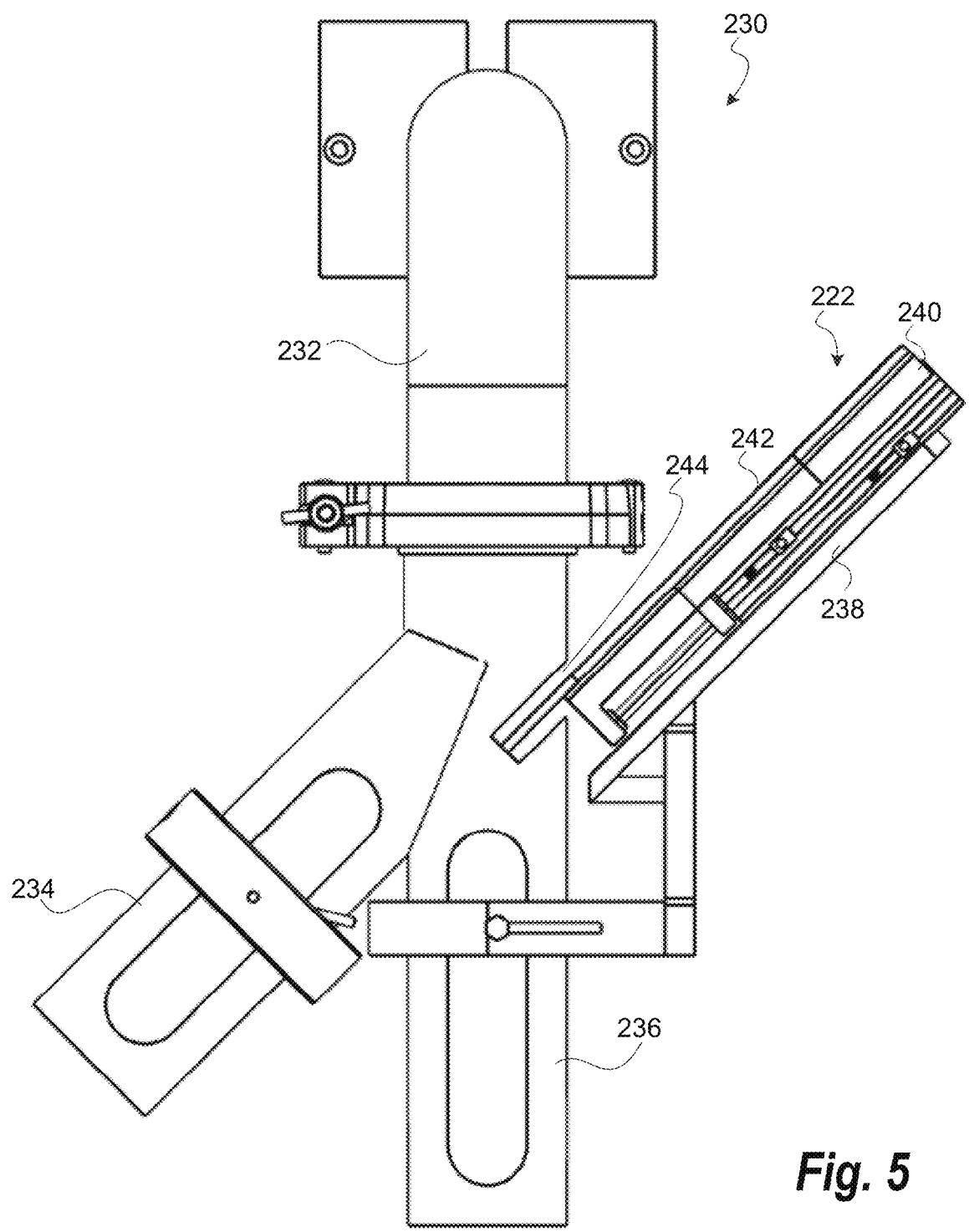
FIG. 5 is a front view of an exemplary sorting system of the system of FIG. 3, consistent with disclosed embodiments.
Figure 6:
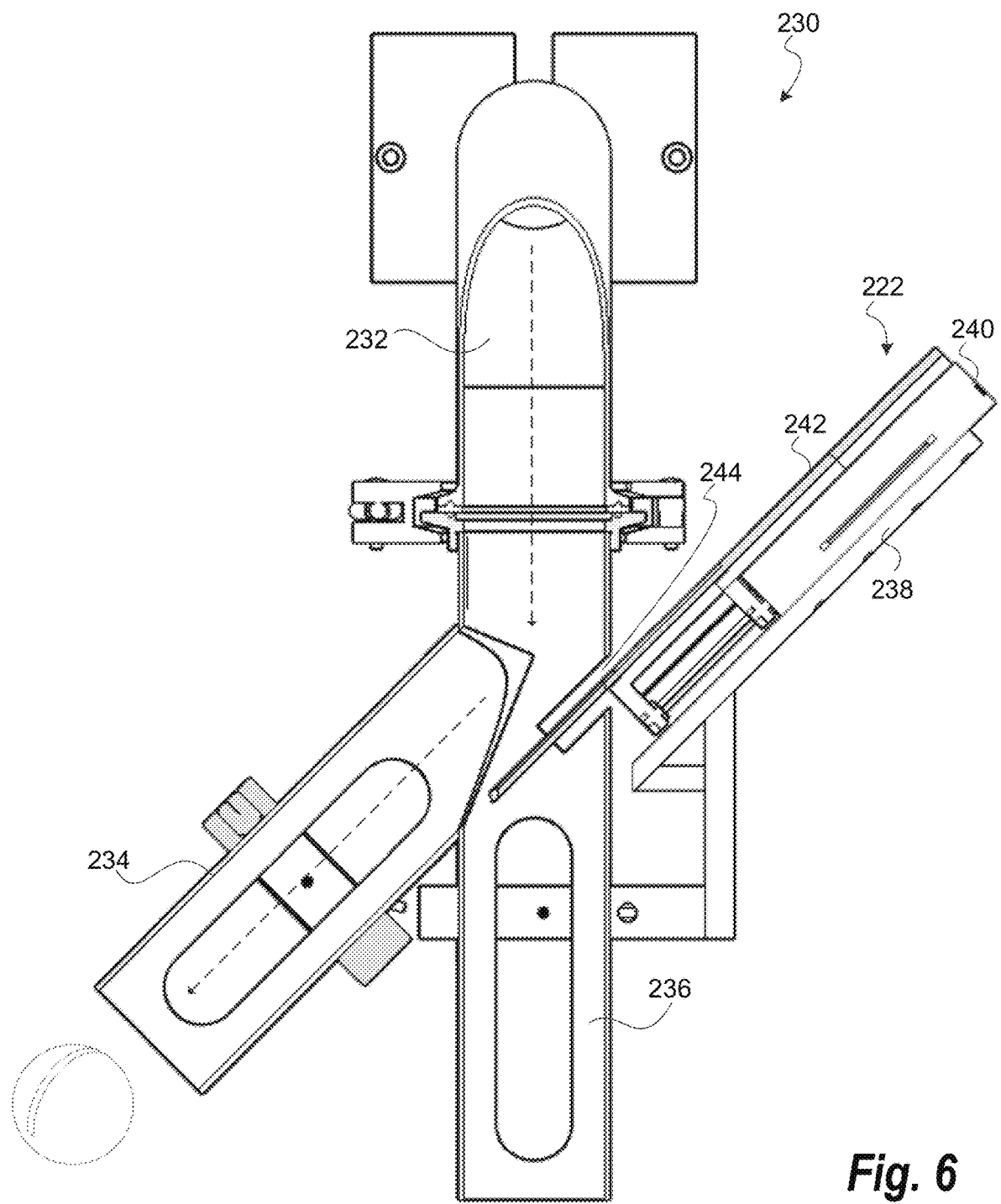
FIG. 6 is a cross-sectional view of the sorting system of FIG. 5 with a guide plate in a first position.
Figure 7:
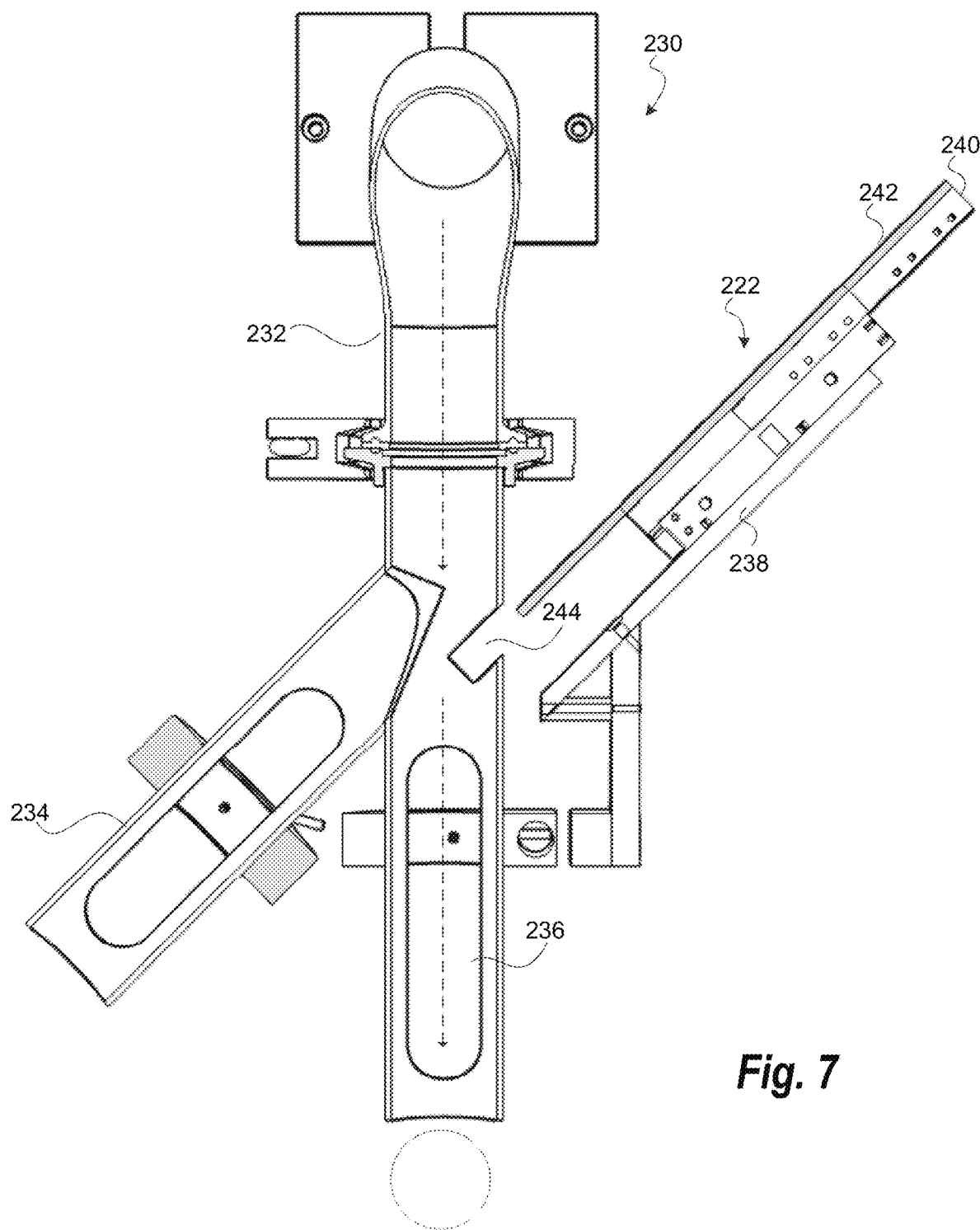
FIG. 7 is a cross-sectional view of the sorting system of FIG. 5 with a guide plate in a second position.

FIGS. 5-7 further illustrate an exemplary sorting system 230 that may be included with the golf ball sorting system 200 for sorting golf balls based on a detection result. The sorting system 230 includes the multi-path tubing 220 comprising a lead tube 232, a first branch tube 234, and a second branch tube 236. The sorting system 230 also includes the path control device 222 including a stationary block 238, a slide block 240, a guide plate 242, and a slot 244 formed in the tubing 220 at an intersection of the lead tube 232, first branch tube 234, and second branch tube 236. A PLC may be configured to control the slide block 240 (e.g., via a control valve) to move between a first position (FIGS. 5 and 6) and a second position (FIG. 7). The guide plate 242 may be attached to the slide block 240 to move therewith (i.e., the guide plate 242 is also movable between a first position and a second position). In the first position, the guide plate 242 may be positioned in the slot 244 to direct a golf ball from the lead tube 232 to the first branch tube 234 (and out into the first collection bin 224). In the second position, the guide plate 242 may be removed from slot 244 to thereby allow the golf ball to pass from the lead tube 232 to the second branch tube 236 (and out into the second collection bin 226). In this way, the PLC may sort golf balls based on a detection result from the detector 216.

The disclosed embodiments have been described but may have variations within the scope of the disclosure. In some embodiments, a detection system may be implemented to distinguish one type of mark from another. In other words, two balls may be sorted even though both balls include a radar detectable mark. In another example, the detection system may be used to sort out counterfeit golf balls by removing golf balls that do not include an authentication mark. In some embodiments, the detection system may be placed in-line in a manufacturing or packaging line and the sorting may occur to remove balls (e.g., via a kickout) that do not pass an inspection (e.g., do not include a radar detectable mark, a mark of sufficient quality, or the system cannot determine the presence of a mark) and pass golf balls that satisfy the inspection along to the next station. Similarly, the present disclosure may be applicable to inspection of in-process golf balls (i.e., golf balls for which manufacturing is not yet complete or partial golf balls such as a core or cover).

The disclosed golf ball sorting system may be particularly applicable to detection of radar detectable marks that are applied to a golf ball to enhance launch monitoring but which are not visible by an observer. In an exemplary inspection process, a plurality of golf balls are fed into a detection system and the output is sorted depending on detection results. The golf balls may be imparted with a threshold speed in order to ensure sufficient reliability of the detection process by a detector. Golf balls having a radar detectable mark may be placed in one area while golf balls not having the mark or for which it was undetermined may be placed in another area. As a result, golf balls that look the same to an observer can be sorted based on underlying characteristics, thereby enhancing the ability of the manufacturer to reliably identify and deliver different types of golf balls.

Further disclosed embodiments include golf balls having detectable marks on at least one layer. The golf balls include a plurality of layers including at least one marked layer. For example, a casing layer that surrounds a golf ball core may include at least one detectable mark thereon. In a disclosed embodiment, at least a portion of the detectable mark is detectable by radar, enabling radar tracking of the golf ball after being struck by a golf club and capture of data such as spin, velocity, and launch angle. Examples of golf balls consistent with this disclosure are further described below together with accompanying drawings. It should be understood that while illustrations may depict an area that is marked as being visible, it should be understood that these marks may be present underneath another layer of the golf ball such that an observer viewing a finished golf ball having a disclosed marking pattern is unable to see the marking pattern.

In some embodiments, different golf balls may be produced with different radar detectable marks, such as for different radar capture scenarios. For example, a first group of golf balls may have a first type of radar detectable mark that is configured to be used in an indoor golf setting. The radar detectable marks on these golf balls may produce a very strong radar reflection signal for ease of capture by a radar device. In another example, a second group of golf balls may have a second type of radar detectable mark that is configured to be used in an outdoor golf setting. In an outdoor setting such as a driving range, multiple golf balls hit by multiple golfers may be in a field of view of a radar device. The radar detectable marks on these golf balls may be configured to provide strong enough radar reflectivity to be reliably detected by the radar device, but not so strong that multiple golf balls are simultaneously detected and blurred in the radar detection data. With these and many other possible radar capture scenarios, there is the possibility for many different types of radar detectable marks to be placed on golf balls. Examples of radar detectable marks are described in the following patent applications, which are hereby incorporated by reference: U.S. patent application Ser. Nos. 17/515,971, 17/515,922, 17/515,943, 17/552,380, 17/553,122, 18/072,801, 18/072,791, 18/191,205.

The possibility of multiple different types of radar detectable marks creates a need for sorting solutions in addition to (or alternatively from) sorting of golf balls that have a radar detectable mark from golf balls that do not have a radar detectable mark. In particular, an exemplary disclosed sorting system sorts golf balls having one type of radar detectable mark from golf balls having a different radar detectable mark. Automated sorting according to disclosed embodiments is especially useful when the marks are not visible to an observer because the marks are covered by at least one other layer of the golf ball (e.g., underneath the cover). Disclosed embodiments thus relate to a plurality of golf balls that have some type of radar detectable mark, sorting of these golf balls from golf balls that do not have any type of radar detectable mark, and further sorting of these golf balls into groups of golf balls having a particular type of radar detectable marks. Disclosed embodiments also include automated sorting systems that sort golf balls based on detection results and detection data from at least one detector. Disclosed embodiments also include sorting methods performed by disclosed sorting systems.

In some embodiments, a plurality of golf balls include at least one golf ball having a first type of detectable mark and at least one golf ball having a second type of detectable mark. The golf balls having different types of detectable marks are distinct from each other in at least one aspect. According to disclosed embodiments, the golf balls are configured such that at least one different aspect between the different golf balls is itself detectable, thereby enabling sorting of the golf balls into groups based on the type of detectable mark. For example, one type of golf ball may include a secondary mark that is detectable by a sensor, such as an x-ray sensor or induction sensor. These golf balls may be sorted from other golf balls based on the detected presence (or absence) of the secondary mark. The secondary mark may be combined with or separate from an additional (e.g., radar-detectable) mark on the golf ball. The terms "second" and "secondary" as used herein do not relate to the importance of the subject that follows and are used only as a convention to distinguish from another mark or portion of a marking pattern.

Figure 8:
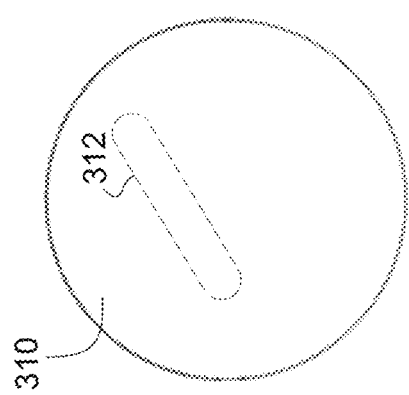
FIG. 8 is a perspective view of two golf balls having different marking patterns.
Figure 8:
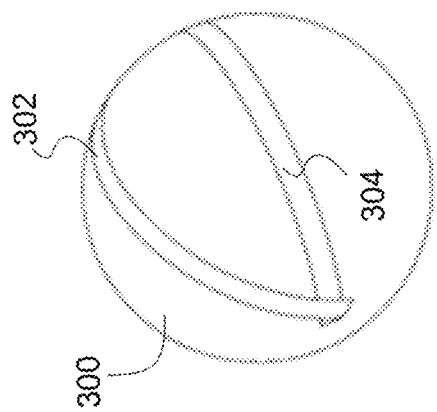

FIG. 8 is an example of a golf ball 300 having a first mark 302 and a second mark 304. The first mark 302 may be detectable by a first detector type and the second mark 304 may be detectable by a second detector type. At least the first mark 302 may be functional for enabling tracking of the golf ball in flight. For example, the first mark 302 may comprise a first material (e.g., a conductive material) that is radar detectable. The second mark 304 may be a secondary mark enabling sorting of the golf ball 300 from golf balls having a different marking pattern. For example, the second mark 304 may include a material that is detectable by a detector other than a radar sensor, such as an induction sensor or x-ray device. As a result, the golf ball 300 can be sorted from golf balls having a different marking pattern. For example, the golf ball 300 can be differentiated from a golf ball 310 that has a radar detectable mark 312 that is different than the first mark 302. A disclosed sorting system may include a detector that would detect the presence of the second mark 304 on golf ball 300 but no corresponding detection for golf ball 310. The golf balls 300, 310 may be differentiated by a sorting system based on this difference in detection result.

As a convention, some golf balls are described in this disclosure as having a marking pattern comprised of a first portion and a second portion. The first and second portions describe areas of the marking pattern on the golf ball. The first portion and the second portion are not necessarily the only portions that make up the marking pattern. The first portion and the second portion can overlap with each other, or may be separate. The first and second portions make up at least a segment of the area of the marking pattern but are not limited to being segments. For example, the first portion and/or the second portion can be an entirety of the marking pattern The first and second portions may be defined based on the presence of a material within the area associated with the portion. For example, a first portion may have a first material detectable by a first detector type and a second portion may have a second material detectable by a second detector type.

Figure 9:
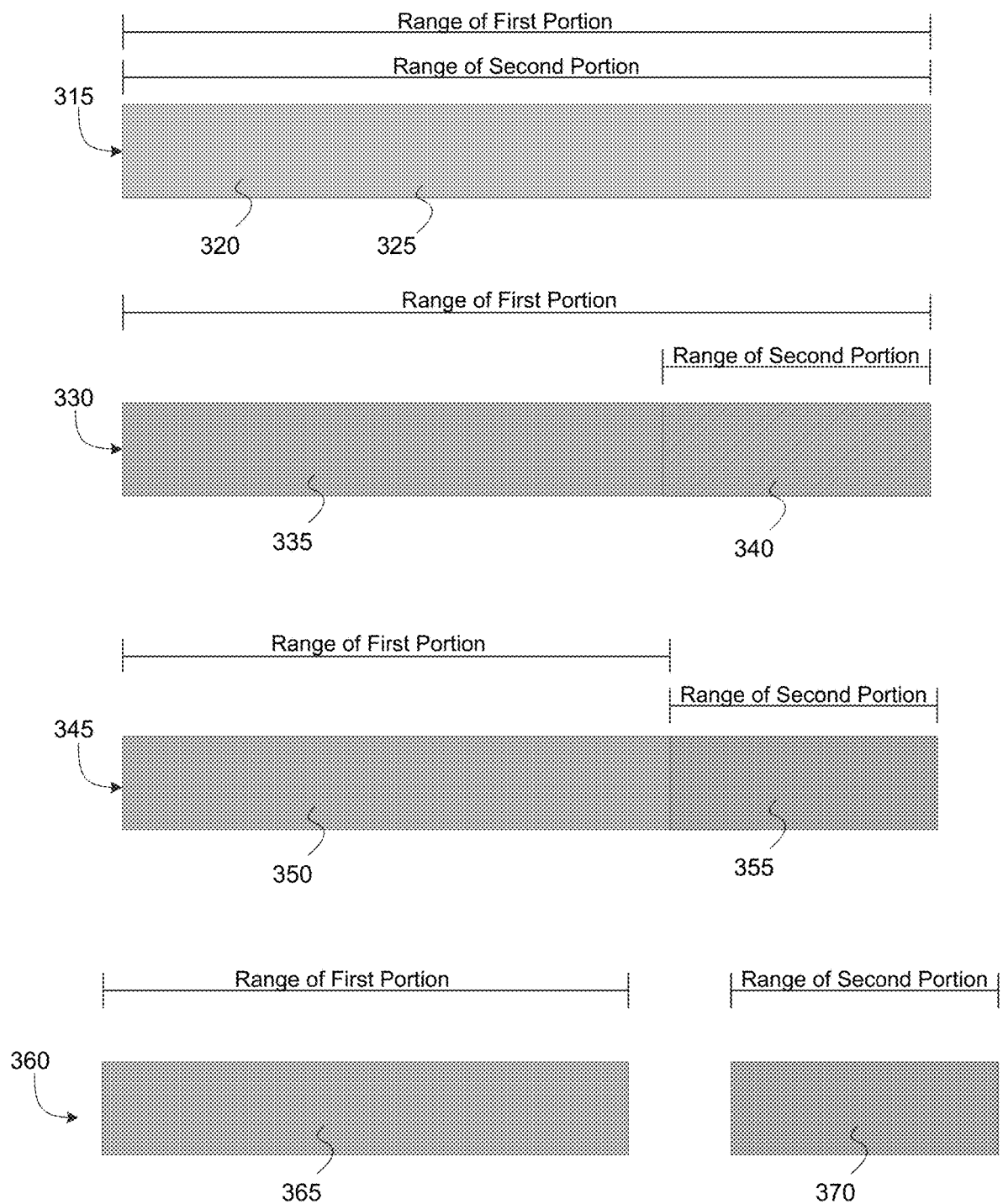
FIG. 9 is a diagram of multiple possible configurations for marking patterns having at least two portions.

FIG. 9 is a diagram showing exemplary marking pattern configurations that may be present on a golf ball. The arrangement of the marking patterns shown in FIG. 9 only illustrates general categories of marking patterns having first and second portions where each portion contains a detectable material, regardless of the shape and/or size of the respective portions. In an exemplary embodiment, each first portion may contain a first material detectable by a first detector type and each second portion may contain a second material detectable by a second detector type. The first and second materials are different materials (e.g., silver and nickel, silver and tungsten, etc.) but the first and second detector types are not necessarily different.

In marking pattern 315, a single continuous mark includes a first portion 320 and a second portion 325. The first portion 320 and the second portion 325 are both an entirety of the mark. In this example, an entire area of the mark comprises both a first material and a second material. The first portion 320 and the second portion 325 overlap such that an entirety of the continuous mark is detectable by a first detector type and a second detector type. For instance, an entire area of the mark may be stamped with an ink containing two ingredient materials, such as a radar detectable material (e.g., silver) and a different material (e.g., nickel or tungsten) detectable by another detector type (e.g., induction or x-ray).

In marking pattern 330, the first portion 335 is an entirety of the mark and the second portion 340 is a subsection of the mark. In this example, the entire area of the mark contains a first material (e.g., a radar detectable material) and a smaller segment of the entire area additionally includes a second material. The marking pattern 330 may be formed, for example, by stamping a first mark having the first material on a layer of the golf ball and then stamping a second mark having the second material on top of a segment of the first mark.

In the marking pattern 345, the first portion 350 and the second portion 355 do not overlap but are formed adjacent to each other as one continuous mark. The first portion 350 contains a first material detectable by a first detector type and the second portion 355 contains a second material detectable by a second detector type. The marking pattern 360 is similar to the marking pattern 345, except that the first portion 365 is spaced from the second portion 370. The marking pattern 360 also includes examples in which the first portion 365 and the second portion 370 are formed on different layers of the golf ball. In one example, to make the marking patterns 345 and 360, two separate marking steps are completed to add the different portions to the golf ball.

The portions are placed adjacent to each other in marking pattern 345 and spaced from each other in marking pattern 360.

In some embodiments, a golf ball includes marking pattern. The marking pattern includes a first portion and a second portion. The first portion is radar detectable and the second portion is detectable by another detector type other than radar (even if the second portion is also detectable by radar). For example, the second portion may be magnetic or ferromagnetic and be detectable by an induction sensor (e.g., magnetic ring sensor, metal detector, etc.). In another example, the second portion may be radiopaque and detectable by an x-ray device.

The first portion includes a radar detectable material. Particularly suitable radar detectable materials for forming the mark include, but are not limited to, electrically conductive inks comprising a base resin and an electrically conductive material. The ink may be water-borne or solvent-borne. The ink may be a 1-component or 2-component ink. The ink may be cured with an isocyanate-based curing agent, UV cure, and/or thermal cure. The ink and the mark formed therefrom may be transparent or opaque. In a particular embodiment, the base resin of the ink is selected from the group consisting of vinyl polymers, urethane polymers, acrylic polymers, epoxy polymers, and combinations of two or more thereof. In another particular embodiment, the electrically conductive material of the ink is selected from the group consisting of silver, conductive carbon, aluminum, graphene, nanotubes, nanometals, and combinations of two or more thereof. Particularly suitable inks are those capable of producing a mark having a resistivity of 0.1 Ohms or 0.5 Ohms or 1 Ohm or 5 Ohms or 6 Ohms or 7 Ohms or 25 Ohms or 2,500 Ohms, or a resistivity within a range having a lower limit and an upper limit selected from these values. Non-limiting examples of suitable commercially available inks are Ink Lab 303 silver conductive ink, commercially available from ITW Trans Tech; silver inks, conductive carbon inks, aluminum inks, silver/carbon blend inks, and aluminum/carbon blend inks, commercially available from Creative Materials Inc.

The second portion includes a material that is detectable by second type of detector (e.g., other than radar). For example, the second portion may include a material that is detectable by an induction sensor (e.g., a metal detector, magnetic sensor, or the like). Examples of materials that are configured to be detected by an induction sensor include magnetic and ferromagnetic materials. Non-limiting examples of magnetic and/or ferromagnetic materials include iron, nickel, cobalt, neodymium, and molybdenum. In another example, the second portion may include a radiopaque material that is detectable by an x-ray device. Non-limiting examples of radiopaque materials include iodine, barium, barium sulfate, tantalum, tungsten, titanium, bismuth, bismuth oxide, bismuth trioxide, bismuth oxychloride, bismuth subcarbonate, zirconium, zirconium oxide, or gold. In some embodiments, the detectable material of the second portion may be an ingredient in an ink composition that is stamped or otherwise printed or applied on at least one layer of the golf ball. For example, the detectable material may be a pigment and/or dye that is an additive to a formulation suitable for being stamped on a golf ball layer.

In some embodiments, the size and/or shape of a marking pattern may be described. The shape of the marking pattern may be broken down into constituent segments that each have a shape independently selected from basic, regular shapes and irregular shapes. The segments may be continuous or spaced from each other. Suitable examples of basic, regular shapes include, but are not limited to, circles, rings, crescents, squares, triangles, rectangles, chevrons, and other regular polygons, irregular polygons, and basic nonpolygonal shapes. For example, the shape of at least one segment of a marking pattern may be a rectangular stripe, having a length and an average width. In some embodiments, a marking pattern includes interconnected segments of the same width. In some embodiments, the average width of the segments of a marking pattern are in a range between 0.5 mm and 5 mm. In some examples, the size and/or shape of a radar detectable first portion of a marking pattern may be compared to the size and/or shape of a second portion. For example, the length, width, or surface coverage of a radar detectable first portion of a marking pattern may be compared to the length, width, or surface coverage of a second portion of a marking pattern. The relative shapes and/or sizes of the first and second portion of a marking pattern may enable advantages such as efficient use of materials, reliable material detection, simultaneous detecting steps, among other potential benefits. The first, radar-detectable portion of a marking pattern should be suitable for use in a radar tracking function of the golf ball. This function may require a particular pattern and/or degree of surface coverage suitable for the intended radar tracking of the flight of the golf ball. The second portion functions to distinguish the first portion from golf balls having other marking patterns and may only require an amount of material suitable for reliable/repeatable detection by an associated detector type (e.g., induction sensor or x-ray device). For instance, the second portion may only require a small amount of detectable material in comparison to the amount of radar detectable material on a marked layer of the golf ball. In this way, material for the second portion may be conserved in some embodiments.

Figure 10:
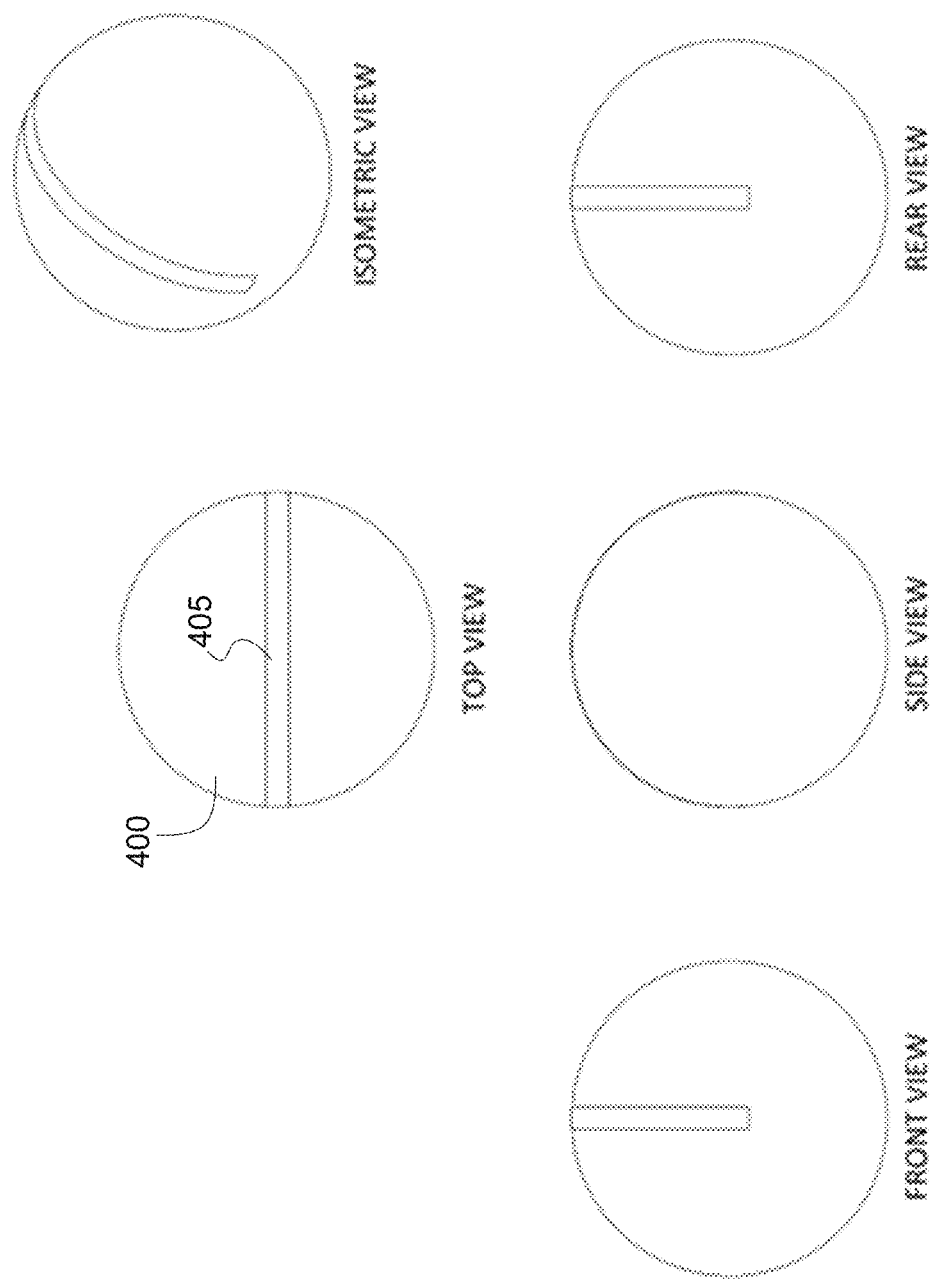
FIG. 10 is a first example of a golf ball having a marking pattern including a first, radar detectable portion and a second portion detectable by a second detector type.

FIG. 10 is an example of a golf ball 400 having a marking pattern 405. The marking pattern 405 includes a continuous mark that is made up of a single stamp of an ink composition comprising a conductive material for radar detection and a second material for enabling sorting of the golf ball 400 from other golf balls having a conductive material. For example, the marking pattern 405 may be a single continuous rectangular stripe comprising both a conductive material (e.g., silver) and a material that is at least one of magnetic, ferromagnetic, or radiopaque (e.g., nickel or tungsten) in the composition. The golf ball 400 can be sorted from golf balls that do not have a radar detectable mark by detecting the conductive material. The golf ball 400 can be further sorted from golf balls that have different radar detectable marks by detecting the second material or other parameter associated with the second material.

Figure 11:
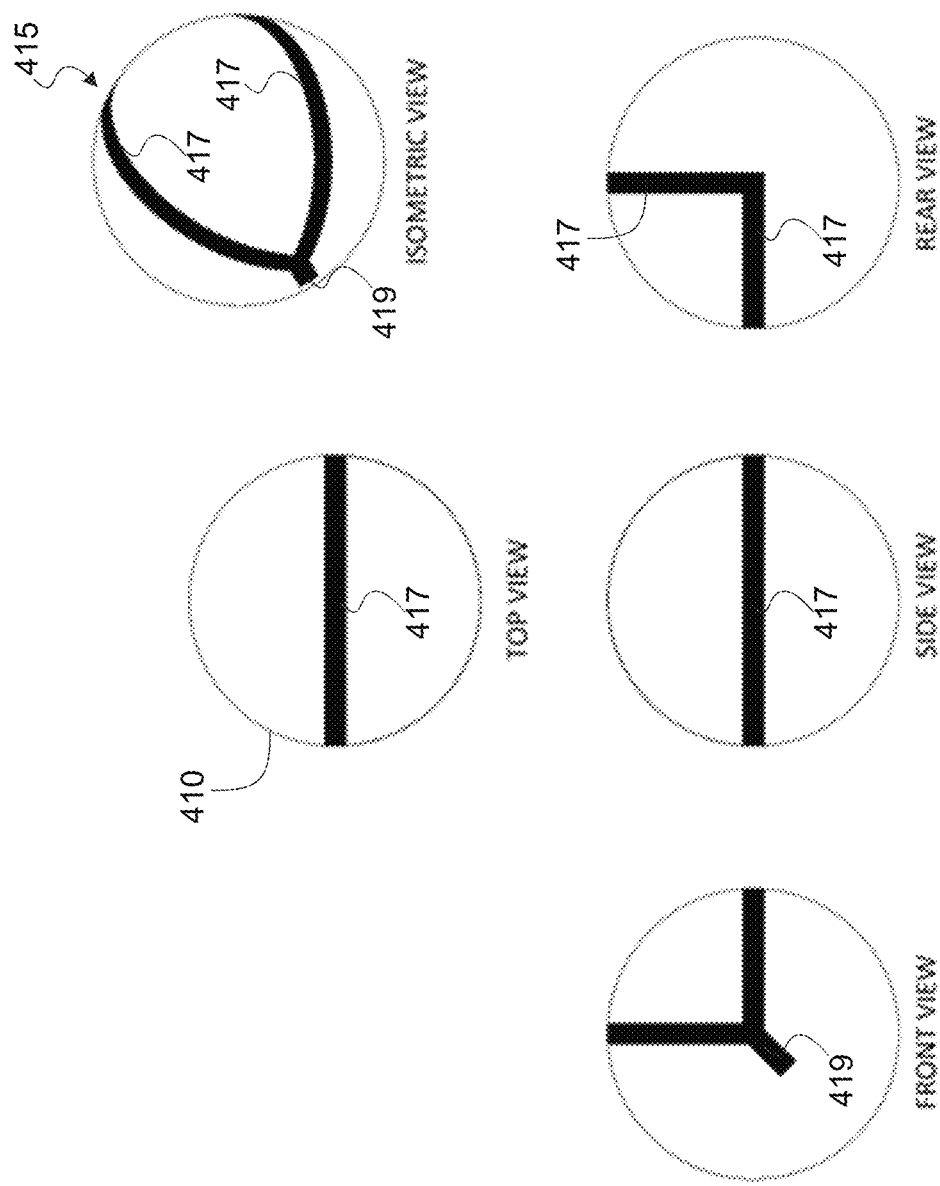
FIG. 11 is another example of a golf ball having a marking pattern including a first, radar detectable portion and a second portion detectable by a second detector type.

FIG. 11 is another example of a golf ball 410 having a marking pattern 415. The marking pattern 415 includes a continuous mark in a pattern having three segments each formed as a rectangular stripe—two larger segments 417 and a smaller segment 419. The larger segments 417 include at least two rectangular stripe segments connected at opposing ends. In an embodiment, the larger segments 417 include a conductive material enabling the marking pattern to be detected by a radar sensor. The smaller segment 419 includes a material for detection by a second detector type. For example, the smaller segment 419 may include a material that is at least one of magnetic, ferromagnetic, or radiopaque and is detectable by at least one of an induction sensor or x-ray device. The smaller segment 419 may or may not also include the conductive material.

Figure 12:
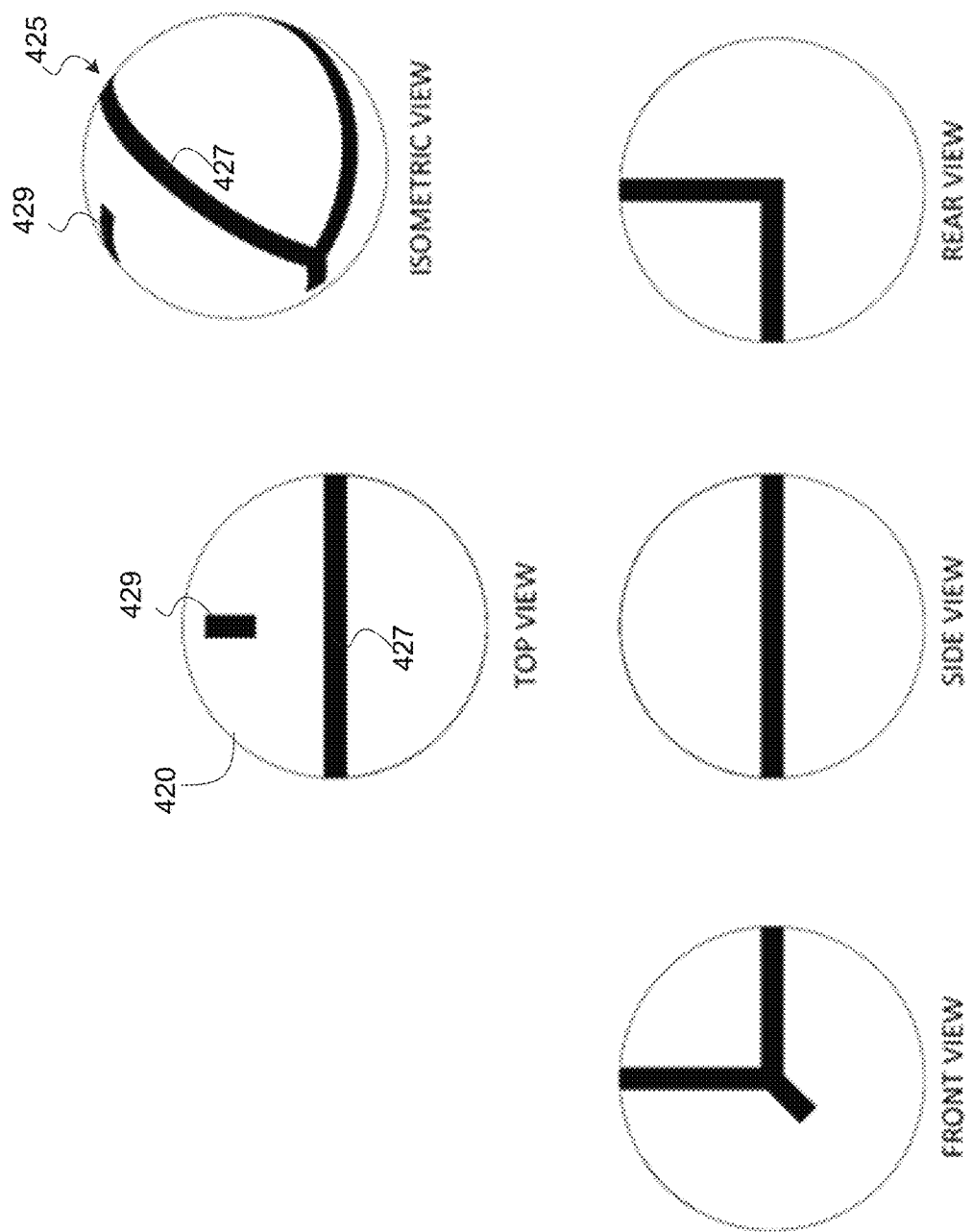
FIG. 12 is another example of a golf ball having a marking pattern including a first, radar detectable portion and a second portion detectable by a second detector type.

FIG. 12 is a another example of a golf ball 420 having a marking pattern 425. The marking pattern 425 includes two separate marks including a first portion 427 which is made of multiple segments and a second portion 429 which covers a smaller percentage of the total surface area of the marked layer of the golf ball. For example, the first portion 427 may include a surface coverage that is at least 5× greater than the surface coverage of the second portion 429. In other embodiments, the surface coverage of the first portion is 10×, 15×, 20×, or 25× greater than the surface coverage of the second portion.

A process for making a golf ball having a radar detectable first portion and a second portion detectable by another detector type may include receiving a golf ball subassembly including one or more subassembly layers and printing a marking pattern on at least one of the one or more subassembly layers using at least one ink composition. The marking pattern may be one or more of the disclosed marking patterns. The marking pattern may include, for example, a first portion including a conductive material and a second portion including at least one of a radiopaque or ferromagnetic material. The process may also include forming a cover layer around the golf ball subassembly such that the marking pattern is not visible to an observer because the cover layer is opaque and covers the marking pattern.

Golf balls according to the present disclosure may be sorted using a sorting system including at least one detector/detection device. A plurality of golf balls may include a group that includes a second portion of a marking pattern and a group of golf balls that include a different second portion or no second portion of a marking pattern. Disclosed sorting methods may include placing each of the plurality of golf balls in the proximity of at least one detector of a particular second portion, determining a detection result based on an inspection of the golf ball, and sorting the plurality of golf balls into groups based on the detection results. As a result, golf balls having a first type of radar detectable mark in addition to a particular secondary mark may be separated from golf balls having a second type of radar detectable mark in addition to a different or no secondary mark.

Figure 13:
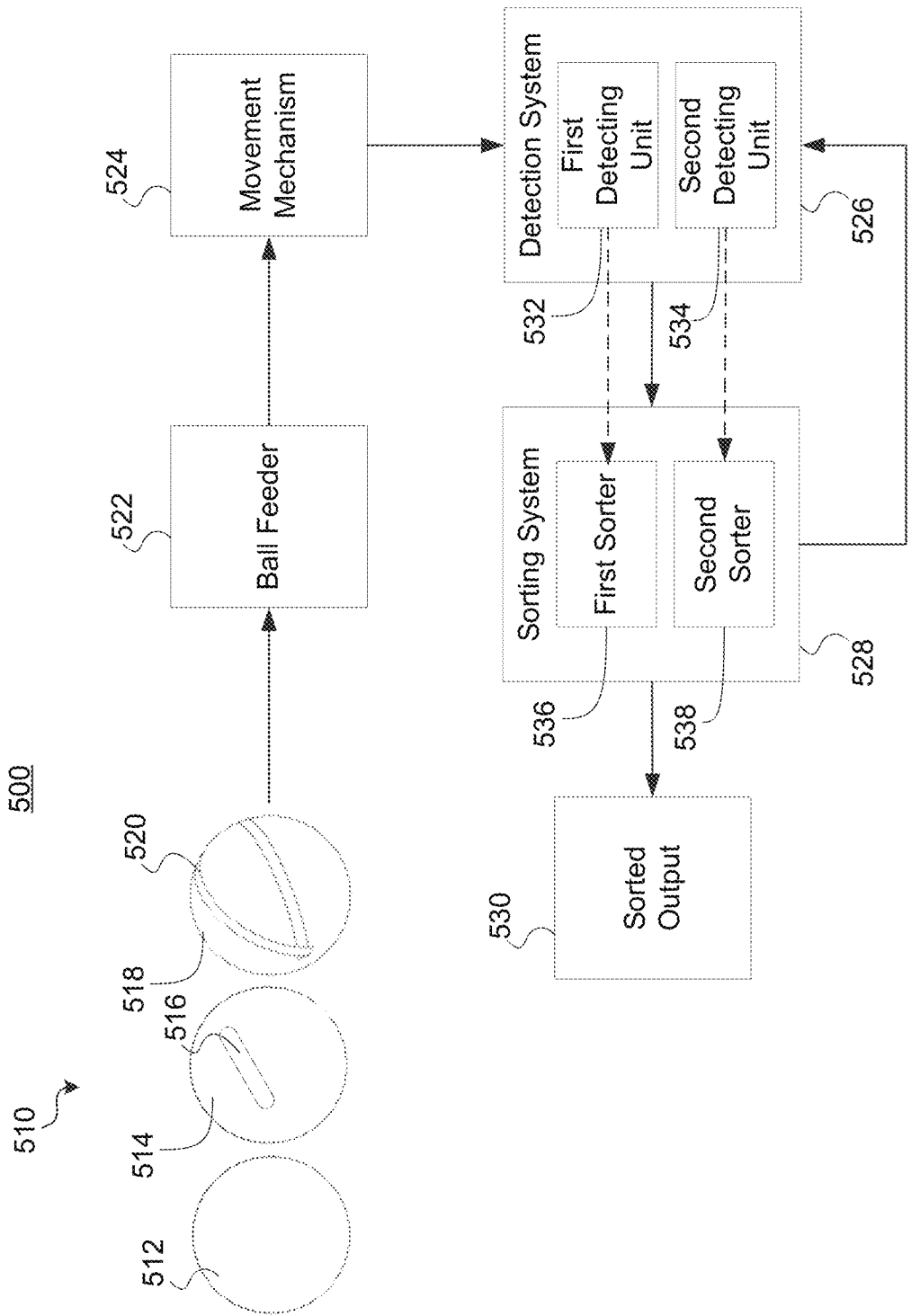
FIG. 13 is a diagram of another exemplary embodiment of a golf ball sorting system, consistent with disclosed embodiments.

FIG. 13 is a diagram of an exemplary golf ball sorting system 500 for sorting golf balls when the golf balls to be sorted include different types of radar detectable marks or marking patterns. System 500 may be similar to system 100 described in relation to FIG. 1 with additional detection and sorting functionality for separating different types of radar detectable marks. The golf ball sorting system 500 may be configured to receive a source of golf balls 510, where the source of golf balls 510 may include at least one of a golf ball 512 having no radar detectable marking pattern, at least one of a golf ball 514 having a first type of radar detectable marking pattern 516, and at least one of a golf ball 518 having a second type of radar detectable marking pattern 520. According to disclosed embodiments, the system 500 may be configured to differentiate between golf balls 510, 512, and 514. In some embodiments, a system may be configured to detect only one of the balls 510, 512, 514 and group the remaining balls together. As has been described herein, the golf balls are depicted with visible marking patterns, but it should be understood that the marking patterns may not be visible to an observer because they are covered by another layer of the golf ball.

The golf balls 514 and 516 may be any two of the golf balls described in the present disclosure having different marking patterns, such as golf balls 300 and 310 described in relation to FIG. 8. In one example, the second type of radar detectable marking pattern 520 includes a secondary material that is separately detectable from the conductive portion of the marking pattern. For example, the second type of marking pattern may include a magnetic, ferromagnetic, or radiopaque material that is detectable by an inductive sensor and/or x-ray device. The first type of marking pattern, not having this additional material, is thus differentiable from the second type of marking pattern.

The golf ball sorting system 500, in at least one embodiment, includes a ball feeder 522, a movement mechanism 524, a detection system 526, and a sorting system 528. The source of golf balls 510 is received at the ball feeder 522 and is output by the sorting system 528 to produce sorted output 530. In some embodiments, the ball feeder 522 may be the same or similar to the ball feeder 118. For example, the ball feeder 522 may be configured to receive and singulate a plurality of golf balls such that they may be individually fed to the movement mechanism 524. The movement mechanism 524 may be the same or similar to the movement mechanism 120. For example, the movement mechanism 524 may be configured to induce movement of a golf ball received from the ball feeder 522 and place the golf ball under conditions that are acceptable for analysis by the detection system 526. In system 500, the ball feeder 522 and/or movement mechanism 524 may include multiple components configured to move golf balls through different stations for multiple inspection and sorting operations.

The detection system 526 includes at least one detecting unit and a control unit. Suitable detecting units and control unit configurations are described in the present disclosure, such as at the description of FIG. 2, and may be applicable to the present embodiment. The detection system 526 may be configured to interface with a golf ball, such as a golf ball placed into motion by the movement mechanism 524. The detection system 526 may include multiple stations for serialized detections to separate the source of golf balls 510 into at least three groups of golf balls. For example, the detection system 526 may include a first detecting unit 532 and a second detecting unit 534. Each detecting unit 532, 534 may be configured to detect at least one parameter of the golf ball, wherein the parameter indicates a characteristic a marking pattern on the golf ball, even if the marking pattern is not visible to an observer because it is covered by another layer of the golf ball. For example, the parameter may be the presence or absence of a material in a marking pattern. In another example, the parameter detected by one or more of the detecting units 532, 534 may be a measured value, such as a signal strength.

The sorting system 528 may be a mechanical device configured to perform an action based on a detection result from the detection system 526. For example, the sorting system 528 may be configured to direct a golf ball to a particular location (e.g., a collection bin) based on a detection result (i.e., a determination that a golf ball does or does not have a radar detectable mark). In another example, the sorting system 528 may be configured to perform an action to identify a golf ball as marked or unmarked, such as by applying a stamp, sticker or tag to the golf ball to identify the result of the detection result. As a result of the sorting system 528 performing an action on golf balls that have been inspected by the detection system 526, the golf ball sorting system 500 produces the sorted output 530. For example, the sorted output 530 may include the golf ball 512 having no radar detectable marking pattern placed into a first bin or pile, the golf ball 514 with the first type of radar detectable marking pattern 516 placed into a second bin or pile, and the golf ball 518 with the second type of radar detectable marking pattern 520 placed into a third bin or pile. The sorting system 528 may include a first sorter 536 and a second sorter 538 configured to perform a sorting action such as separating some golf balls from others. For example, the first sorter 536 and/or the second sorter 538 may be the same or similar to one or more of the sorting mechanisms described in the present disclosure, such as those described in relation to FIGS. 5-7.

In an exemplary embodiment, the disclosed golf ball sorting system 500 is configured to perform serial detections to separate the source of golf balls 510 into at least three groups. For example, the golf ball sorting system 500 may separate the golf balls 510 into three groups each corresponding to one of three categories: a first category of golf balls that do not have a radar detectable marking pattern, a second category of golf balls that have a first type of radar detectable marking pattern, and a third category of golf balls that have a second type of radar detectable marking pattern.

In order to arrive at the three sorted groups, a first detection and sorting step may take place to separate golf balls in one of the categories, leaving the remaining two categories of golf balls in a subset. A second detection and sorting step may then be applied to the subset of remaining golf balls to separate the golf balls according to the other two categories. In one example, the first category of golf balls (no radar detectable marking pattern) are separated from the second and third categories of golf balls, and then the remaining golf balls are separated according to type of marking pattern. In another example, golf balls having one of the first or second types of marking patterns are separated from the others, and then the golf balls having no radar detectable marking pattern are separated from the remaining subset to arrive at the three sorted groups.

While three categories of golf balls are described in this example to produce three separate sorted groups, it should be understood that the disclosed embodiments may apply to sorting golf balls further into other numbers of groups. It is contemplated that if there are N number of different types of marking patterns, N−1 detecting units and sorting steps may be utilized in series to sort the golf balls into desired number of groups.

Figure 14:
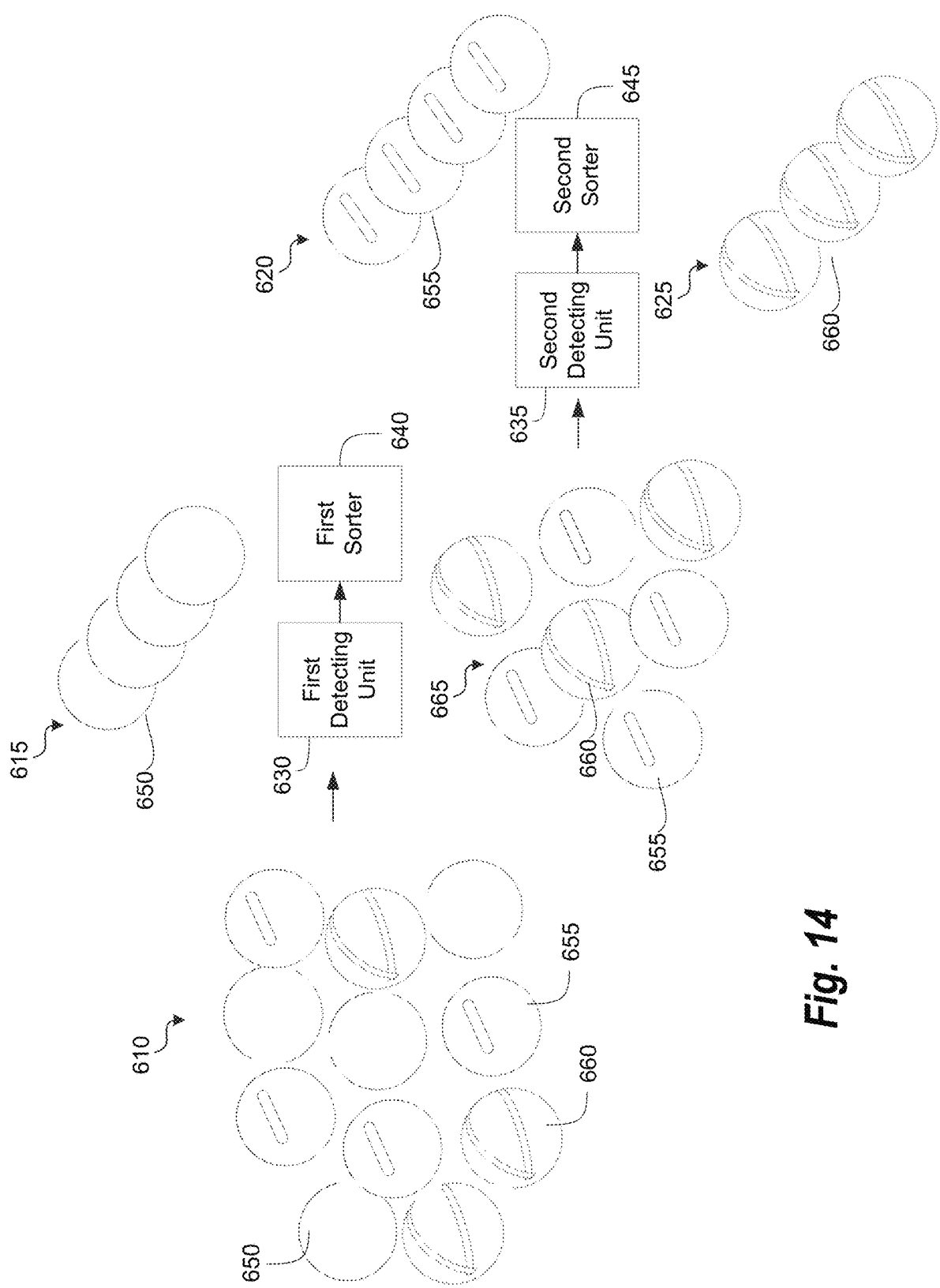
FIG. 14 is a diagram of a serial detection method for sorting a plurality of golf balls into at least three groups, consistent with disclosed embodiments.

FIG. 14 is a diagrammatic example of a serial detection method for sorting a plurality of golf balls 610 into three groups 615, 620, 625 by a detection system having a first detecting unit 630 and a second detecting unit 635 and a sorting system having a first sorter 640 and a second sorter 645. A control unit (not shown) may be connected to depicted components to deliver detection results and instruct the sorters to perform actions to separate golf balls based on the detection results. The plurality of golf balls 610 include three categories of golf balls, including golf balls 650 that do not have a radar detectable marking pattern, golf balls 655 that have a first type of radar detectable marking pattern, and golf balls 660 that have a second type of radar detectable marking pattern. As has been described herein, the golf balls are depicted with visible marking patterns, but it should be understood that the marking patterns may not be visible to an observer because they are covered by another layer of the golf ball.

The golf balls 650 that do not include a radar detectable marking pattern may be different types of conventional golf balls and are not necessarily all the same type or brand of golf ball. Regarding the golf balls 655 and 660, both types of radar detectable marking patterns include a conductive material capable of being detected by a radar detector, an aspect that is described throughout the present disclosure. The first type of marking pattern and the second type of marking pattern may differ in the physical pattern on the golf ball (different line thickness, arrangement, shaped, etc.) and/or may differ in material composition of the marking pattern.

In an exemplary sorting method, the plurality of golf balls 610 are provided to the first detecting unit 630 (e.g., by a ball feeder, movement mechanism, etc.). The first detecting unit 630 inspects each of the plurality of golf balls 610 and outputs a first detection result through a control unit. In an exemplary embodiment, a detection result is a continuous stream of detection data related to a detecting unit inspecting a plurality of golf balls. The stream of detection data (and thus the first detection result) may include discrete detection results for each golf ball inspected. The first sorter 640 is configured to receive the stream of detection data and perform sorting actions accordingly to separate golf balls 615 from a subset of golf balls 665 that includes golf balls 655 and 660. The subset of golf balls 665 sorted by the first sorter 640 includes golf balls 655 having the first type of radar detectable marking pattern and golf balls 660 having the second type of radar detectable marking pattern. This subset of golf balls 665 are delivered to the second detecting unit 635 for further sorting based on the type of marking pattern.

The second detecting unit 635 is configured to inspect each of the golf balls in the subset 665 and produce a second detection result. The second detection result may also be a continuous stream of detection data with discrete detection results associated with each inspected golf ball. A control unit associated with the second detecting unit 635 is configured to deliver the second detection result to the second sorter 645 for separating the golf balls 665 from the golf balls 660. The serial detection method diagrammed in FIG. 14 therefore enables sorting of the golf balls 610 into three groups 615, 620, 625 based on presence of a marking pattern and further based on type of marking pattern.

In an exemplary embodiment, the first detecting unit 630 is configured to detect the presence of a radar detectable marking pattern and output associated detection data for each inspected golf ball as a first detection result to enable the first sorter 640 to separate golf balls 615 that do not have a radar detectable marking pattern from golf balls 665 that have a radar detectable marking pattern.

In an exemplary embodiment, the second detecting unit 635 is configured to detect the presence of a parameter that differentiates the first type of radar detectable marking pattern from the second type of radar detectable marking pattern. For example, the second detecting unit may be configured to detect a secondary material that is present in one type of marking pattern type but not present (or present in a different amount) in another type of marking pattern. Several marking pattern differentiations are described in the present disclosure and may be the basis for the second detecting unit 635 producing a detection result that differentiates between the golf balls 655 and 660.

In some embodiments, the first detecting unit 630 is a radar detector and the second detecting unit 635 is a detector type other than radar. For example the first detector 630 may be a radar detector configured to detect a conductive material in the marking patterns on golf balls 655, 660. The second detecting unit 635 may be an inductive sensor configured to detect a magnetic and/or ferromagnetic material that is present in the second type of marking pattern but not present in the first type of marking pattern. For example, the second detecting unit 635 may be an inductive sensor configured to detect iron, nickel, cobalt, neodymium, and molybdenum. In another example, the second detector 635 may be an x-ray device configured to detect a radiopaque material, such as iodine, barium, barium sulfate, tantalum, tungsten, titanium, bismuth, bismuth oxide, bismuth trioxide, bismuth oxychloride, bismuth subcarbonate, zirconium, zirconium oxide, or gold.

In another embodiment, the first detecting unit 635 is an inductive sensor instead of a radar detector. For example, the first detecting unit 635 may be an inductive ring sensor. An example of a suitable inductive ring sensor is available from Pulsotronic GmbH & Co. KG, which has been found to produce different signal results for golf balls depending on whether the golf ball includes a radar detectable marking pattern. In this embodiment, a threshold signal measurement may be set within a control unit. Each golf ball, including golf balls 655, may produce a signal when passed through the inductive sensor. The control unit associated with the first detecting unit 630 is configured to distinguish a signal produced by a golf ball having a radar detectable marking pattern from a golf ball that does not have a radar detectable marking pattern. The first sorter 640 is configured to separate the golf balls 650 from the golf balls 655, 660 based on the detection result from the inductive sensor first detecting unit 630. The subset of golf balls 665 may then be delivered to the second detecting unit 635, which may be another inductive sensor configured to further differentiate based on the presence of an additional magnetic and/or ferromagnetic material or an x-ray device configured to differentiate types of marking patterns based on the presence of a radiopaque material.

Figure 15:
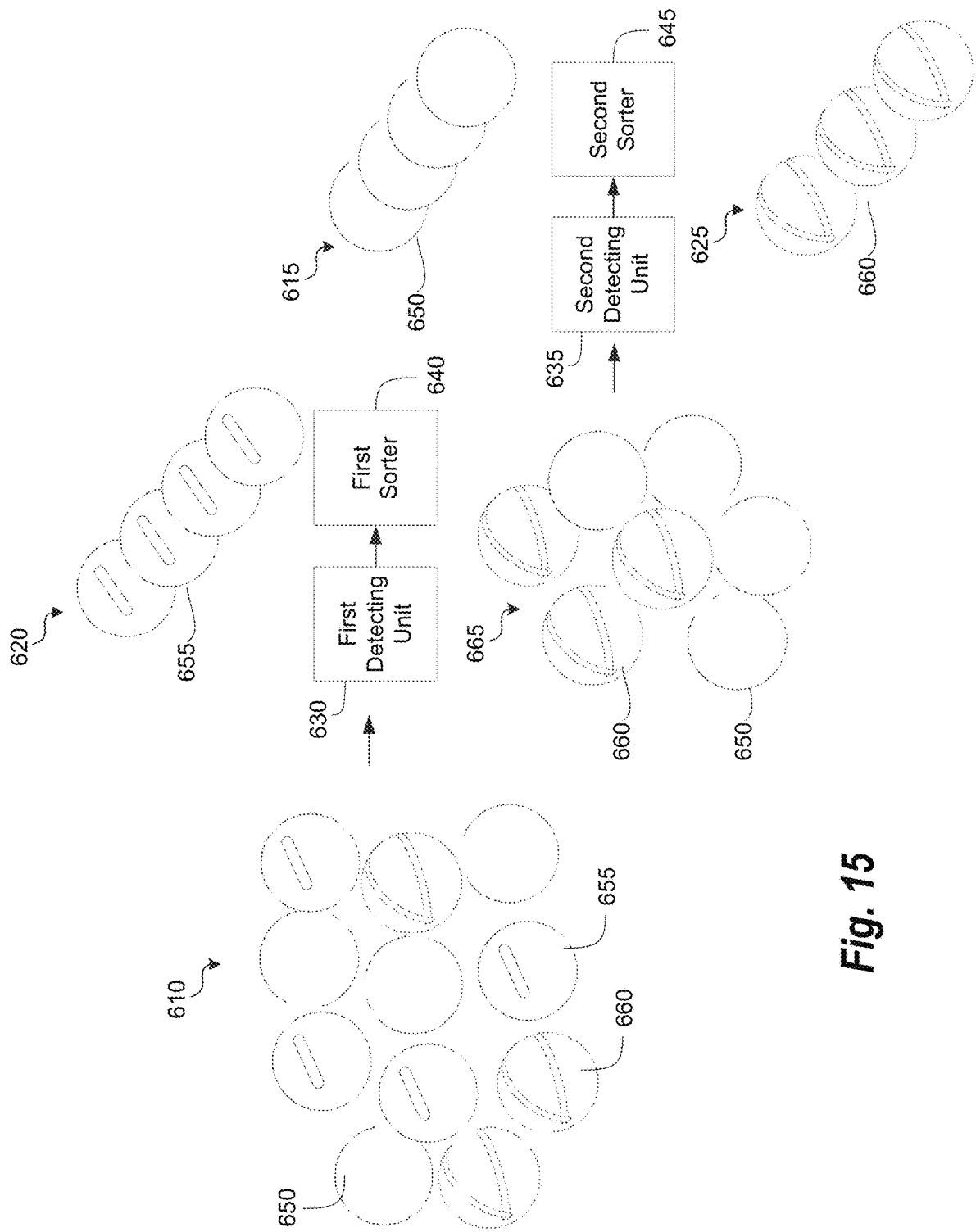
FIG. 15 is another diagram of a serial detection method for sorting a plurality of golf balls into at least three groups, consistent with disclosed embodiments.

The disclosed embodiments include serial detection methods for separating and sorting golf balls based on different parameters, including whether the golf ball has a radar detectable mark and further based on the type of radar detectable mark. In FIG. 14, the sorting method includes first separating the golf balls that have no radar detectable mark from the remainder that do have a radar detectable mark and then sorting the latter subset by type of marking. These embodiments include examples of first using a radar detector and then subsequently using an inductive sensor or x-ray device. These embodiments also include first using an inductive sensor followed by use of another inductive sensor or an x-ray device. In other embodiments, the sorting order may be reversed. For example, FIG. 15 depicts an example in which one of the types of marking patterns (e.g., golf balls 655) may be first separated (by the first detecting unit 630 and first sorter 640) from the other type of marking pattern (golf balls 660) and the golf balls having no marking pattern (golf balls 650). Thereafter, the golf balls having the other type of marking pattern 660 may be separated form the golf balls having no marking pattern 650 (by the second detecting unit 635 and the second sorter 645). In the embodiment of FIG. 15, the first detecting unit 630 may be an inductive sensor or x-ray device configured to detect a secondary material in the marking pattern, such as a magnetic and/or ferromagnetic material or a radiopaque material. The remaining golf ball subset may be delivered to a radar detector (or other inductive sensor) as a second detecting unit 635 for separating the golf balls that do not have any radar detectable marking pattern.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all modifications and embodiments which would come within the spirit and scope of the present invention.

What is claimed is:

1. A golf ball sorting system, comprising:
a ball feeder configured to transport a plurality of golf balls, wherein at least some of the plurality of golf balls have a marking pattern comprising a conductive material that is not visible to an observer because the marking pattern is covered by at least one other layer of the golf ball;
a detection system configured to receive the plurality of golf balls, inspect the plurality of golf balls, and output a detection result from a control unit, wherein the detection system comprises a first detecting unit configured to output a first detection result and a second detecting unit configured to output a second detection result, wherein the detection result comprises the first detection result and the second detection result; and
a sorting system configured to receive the detection result and sort the plurality of golf balls based on the detection result to separate the plurality of golf balls into at least three groups each corresponding to different categories of golf balls, including a first category of golf balls that do not have the marking pattern comprising a conductive material, a second category of golf balls that have a first type of the marking pattern comprising a conductive material, and a third category of golf balls that have a second type of the marking pattern comprising a conductive material.

2. The golf ball sorting system of claim 1, wherein the sorting system comprises a first sorter configured to separate golf balls in the first category from golf balls in the second or third category.

3. The golf ball sorting system of claim 2, wherein the sorting system comprises a second sorter configured to separate golf balls in the second category from golf balls in the third category.

4. The golf ball sorting system of claim 1, wherein the first detecting unit is configured to detect a conductive material, and wherein the sorting system is configured to separate golf balls in the first category from golf balls in the second or third category based on the first detection result, and
wherein the second detecting unit is configured to differentiate between the first type of marking pattern and the second type of marking pattern, and wherein the sorting system is configured to separate golf balls in the second category from golf balls in the third category based on the second detection result.

5. The golf ball sorting system of claim 4, wherein the first detecting unit is a radar detector and the second detecting unit is a type of detector other than radar.

6. The golf ball sorting system of claim 5, wherein the second detecting unit is an inductive sensor or x-ray device.

7. The golf ball sorting system of claim 4, wherein the first detecting unit is an inductive sensor and the second detecting unit is an inductive sensor.

8. A golf ball sorting system, comprising:
a radar detector configured to inspect a golf ball and determine a first detection result based on whether a first marking pattern comprising an electrically-conductive ink is identified on the inspected golf ball, wherein the first marking pattern is not visible to an observer because the first marking pattern is covered by at least one other layer of the golf ball;
an inductive sensor configured to inspect a golf ball and determine a second detection result based on whether a second marking pattern comprising an ink containing a magnetic and/or ferromagnetic material is identified on the inspected golf ball, wherein the second marking pattern is not visible to an observer because the second marking pattern is covered by at least one other layer of the golf ball; and a sorting system configured to sort golf balls into at least three groups based on the first detection result and the second detection result.

\* \* \* \* \*